United States Patent
Holma et al.

(10) Patent No.: US 7,853,260 B2
(45) Date of Patent: Dec. 14, 2010

(54) METHOD AND APPARATUS FOR CELL IDENTIFICATION FOR UPLINK INTERFERENCE AVOIDANCE USING INTER-FREQUENCY MEASUREMENTS

(75) Inventors: Harri Holma, Irving, TX (US); Uwe Schwarz, Veikkola (FI); Peter Muszynski, Espoo (FI); Sari Korpela, Kauniainen (FI)

(73) Assignee: Nokia Corporation, Espoo (FI)

( * ) Notice: Subject to any disclaimer, the term of this patent is extended or adjusted under 35 U.S.C. 154(b) by 1768 days.

(21) Appl. No.: 10/421,892

(22) Filed: Apr. 24, 2003

(65) Prior Publication Data

US 2004/0005890 A1    Jan. 8, 2004

Related U.S. Application Data

(60) Provisional application No. 60/375,813, filed on Apr. 29, 2002.

(51) Int. Cl.
*H04W 36/00* (2009.01)

(52) U.S. Cl. ............... 455/443; 370/329; 370/330; 370/331; 370/332; 455/432.1; 455/437; 455/438; 455/442; 455/444; 455/452.2; 455/453; 455/454

(58) Field of Classification Search .......... 455/432.1, 455/442–444, 453–454, 437, 438, 452.2; 370/329–332
See application file for complete search history.

(56) References Cited

U.S. PATENT DOCUMENTS

| | | | |
|---|---|---|---|
| 5,109,528 A | 4/1992 | Uddenfeldt | 455/442 |
| 5,189,734 A | 2/1993 | Bailey et al. | |
| 5,345,600 A | 9/1994 | Davidson | 455/501 |
| 5,375,123 A | 12/1994 | Anderson et al. | 370/95.1 |
| 5,455,962 A | 10/1995 | Kotzin | 455/33.1 |
| 5,471,670 A | 11/1995 | Hess | 455/33.2 |
| 5,487,174 A | 1/1996 | Persson | 455/444 |
| 5,491,837 A | 2/1996 | Haartsen | 455/62 |
| 5,551,064 A * | 8/1996 | Nobbe et al. | 455/62 |
| 5,636,208 A | 6/1997 | Chang et al. | 370/347 |
| 5,669,060 A * | 9/1997 | Guimont | 455/436 |
| 5,778,319 A | 7/1998 | Sawaki | |
| 5,805,982 A | 9/1998 | Hulsebosch | |
| 5,822,699 A | 10/1998 | Kotzin et al. | 455/447 |
| 5,943,326 A | 8/1999 | Schroderus | |

(Continued)

FOREIGN PATENT DOCUMENTS

GB    2 337 415 A    11/1999

(Continued)

*Primary Examiner*—Hemant Patel
(74) *Attorney, Agent, or Firm*—Slater & Matsil, L.L.P.

(57) ABSTRACT

A method and system for cell identification for uplink interference avoidance that includes a network device and mobile device in a communications network. Inter-frequency measurements are performed by a mobile device on a downlink carrier currently not used by the mobile device. A result of the inter-frequency measurements is compared with another value. Second measurements are initiated on the downlink carrier currently not used by the mobile device based on the comparison. A cell is identified based on the second measurements. The inter-frequency measurements may include receive signal strength indicator (RSSI) measurements, received signal code power (RSCP) measurements, or average channel power-to-total signal power ratio (Ec/Io) measurements. The second measurements may include signal quality measurements.

19 Claims, 5 Drawing Sheets

U.S. PATENT DOCUMENTS

| | | | |
|---|---|---|---|
| 5,970,412 A | 10/1999 | Maxemchuck | 455/477 |
| 5,974,106 A | 10/1999 | Dupont et al. | |
| 5,999,816 A * | 12/1999 | Tiedemann et al. | 455/437 |
| 6,021,123 A | 2/2000 | Mimura | |
| 6,026,301 A * | 2/2000 | Satarasinghe | 455/436 |
| 6,038,450 A | 3/2000 | Brink et al. | |
| 6,052,596 A | 4/2000 | Barnickel | |
| 6,055,427 A * | 4/2000 | Ojaniemi | 455/436 |
| 6,078,570 A | 6/2000 | Czaja et al. | |
| 6,111,864 A | 8/2000 | Kabasawa | 370/332 |
| 6,119,018 A | 9/2000 | Kondo | 455/522 |
| 6,163,694 A * | 12/2000 | Lind et al. | 455/435.3 |
| 6,188,904 B1 | 2/2001 | Marsan | 455/450 |
| 6,208,631 B1 * | 3/2001 | Kim | 370/332 |
| 6,212,368 B1 | 4/2001 | Ramesh et al. | 455/277.2 |
| 6,240,292 B1 | 5/2001 | Haberman et al. | |
| 6,240,553 B1 | 5/2001 | Son et al. | 725/95 |
| 6,252,861 B1 * | 6/2001 | Bernstein et al. | 370/331 |
| 6,272,325 B1 * | 8/2001 | Wiedeman et al. | 455/117 |
| 6,304,754 B1 | 10/2001 | DeSantis et al. | 455/436 |
| 6,321,089 B1 * | 11/2001 | Han | 455/438 |
| 6,327,472 B1 | 12/2001 | Westroos et al. | 455/450 |
| 6,337,984 B1 | 1/2002 | Hong et al. | |
| 6,339,589 B1 | 1/2002 | Uebayashi et al. | |
| 6,385,437 B1 * | 5/2002 | Park et al. | 455/69 |
| 6,418,317 B1 | 7/2002 | Cuffaro et al. | |
| 6,438,378 B1 * | 8/2002 | Kouno | 455/439 |
| 6,442,145 B1 | 8/2002 | De Lange et al. | |
| 6,456,652 B1 * | 9/2002 | Kim et al. | 375/224 |
| 6,496,493 B1 | 12/2002 | Chung | 370/332 |
| 6,504,828 B1 | 1/2003 | Corbett | 370/331 |
| 6,507,741 B1 | 1/2003 | Bassirat | 455/440 |
| 6,532,364 B1 | 3/2003 | Uchida et al. | |
| 6,535,739 B1 | 3/2003 | Chen et al. | |
| 6,546,252 B1 | 4/2003 | Jetzek et al. | |
| 6,549,524 B1 * | 4/2003 | Shin | 370/331 |
| 6,574,203 B2 | 6/2003 | Bernstein et al. | 370/332 |
| 6,591,107 B1 | 7/2003 | Sonetaka | |
| 6,618,365 B1 * | 9/2003 | Vannatta et al. | 370/333 |
| 6,690,936 B1 | 2/2004 | Lundh | 455/436 |
| 6,725,058 B2 | 4/2004 | Rinne et al. | |
| 6,748,219 B2 | 6/2004 | Jokinen | |
| 6,792,276 B1 * | 9/2004 | Butovitsch et al. | 455/453 |
| 6,845,238 B1 * | 1/2005 | Muller | 455/436 |
| 6,850,500 B2 | 2/2005 | Zeira et al. | |
| 7,031,277 B2 | 4/2006 | Choi et al. | |
| 7,102,994 B2 | 9/2006 | Sezgin et al. | |
| 7,103,362 B2 | 9/2006 | Wu | |
| 7,123,579 B1 | 10/2006 | Lyu | |
| 7,280,814 B2 | 10/2007 | Austin et al. | |
| 2001/0014608 A1 | 8/2001 | Backstrom et al. | 455/450 |
| 2001/0016482 A1 * | 8/2001 | Bergstrom et al. | 455/332 |
| 2001/0031638 A1 * | 10/2001 | Korpela et al. | 455/449 |
| 2001/0036810 A1 | 11/2001 | Larsen | 455/11.1 |
| 2002/0004379 A1 | 1/2002 | Gruhk et al. | 455/403 |
| 2002/0019231 A1 * | 2/2002 | Palenius et al. | 455/437 |
| 2002/0027890 A1 | 3/2002 | Bernstein et al. | 370/331 |
| 2002/0034947 A1 | 3/2002 | Soliman | 455/436 |
| 2002/0045448 A1 | 4/2002 | Park et al. | 455/436 |
| 2002/0068571 A1 | 6/2002 | Ohlsson et al. | 455/442 |
| 2002/0072372 A1 | 6/2002 | Tsutsumi et al. | 455/442 |
| 2002/0090951 A1 | 7/2002 | Kanagawa | 455/446 |
| 2002/0111163 A1 * | 8/2002 | Hamabe | 455/425 |
| 2002/0147008 A1 | 10/2002 | Kallio | 455/426.1 |
| 2003/0013443 A1 | 1/2003 | Willars et al. | 455/432.1 |
| 2003/0064729 A1 | 4/2003 | Yamashita | 455/451 |
| 2003/0096610 A1 | 5/2003 | Courtney et al. | 455/429 |
| 2003/0153290 A1 * | 8/2003 | Sako | 455/150.1 |
| 2005/0032520 A1 | 2/2005 | Muller | |

FOREIGN PATENT DOCUMENTS

| | | |
|---|---|---|
| GB | 2337415 | 11/1999 |
| GB | 2 346 044 A | 7/2000 |
| JP | 2000-156884 A | 6/2000 |
| WO | 9319537 | 9/1993 |
| WO | WO 99/44384 | 9/1999 |
| WO | WO 00/38457 | 6/2000 |
| WO | WO 00/74421 A1 * | 12/2000 |

* cited by examiner

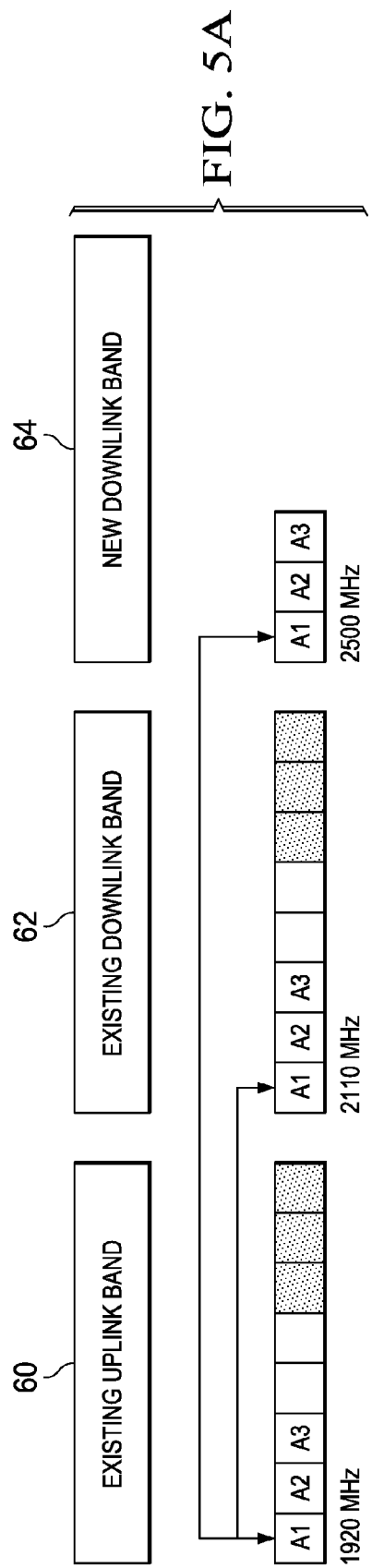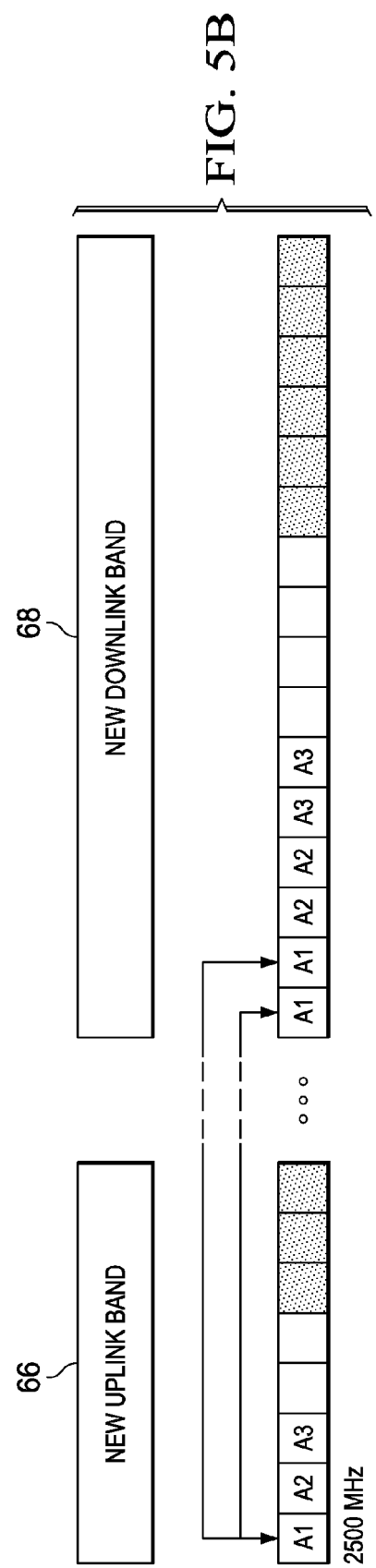

METHOD AND APPARATUS FOR CELL IDENTIFICATION FOR UPLINK INTERFERENCE AVOIDANCE USING INTER-FREQUENCY MEASUREMENTS

This application claims the benefit of U.S. Provisional Patent Application Ser. No. 60/375,813 filed Apr. 29, 2002, the contents of which is expressly incorporated by reference herein.

BACKGROUND

1. Field of the Invention

This invention relates to CDMA systems, and more specifically to cell identification using inter-frequency measurements in CDMA systems.

2. Description of the Related Art

In Code Division Multiple Access (CDMA) systems, a soft handover (SHO) area is characterized by similarly strong pilot power signals (CPICH Ec/Io in Wideband CDMA (WCDMA)). Pilot powers are measured by the mobile device in idle as well as in connected mode. In connected mode, it is very important that the mobile device (UE) is always connected to the optimum cell(s). Otherwise, it would cause significant interference in an uplink and waste network capacity. In idle mode, it is important to camp in the strongest cell to allow a quick call initiation and not cause interference during call initiation.

The uplink interference to the neighboring cells in WCDMA may be avoided with (1) soft handover within one frequency based on downlink CPICH Ec/Io measurements, or (2) "downlink dying first" with adjacent channel interference. These methods work when there is a fixed pair of uplink and downlink as in the Universal Mobile Telecommunications System (UMTS) core band in 2.1 GHz. This approach cannot be applied for 2.5 GHz when the same uplink carrier in 1.9 GHz can be paired with downlink in 2.1 GHz or in 2.5 GHz. Therefore, new approaches are needed to avoid the uplink interference.

SUMMARY OF THE INVENTION

A method and system for cell identification for uplink interference avoidance that includes a network device and mobile device in a communications network. Inter-frequency measurements are performed by a mobile device on a downlink carrier currently not used by the mobile device. A result of the inter-frequency measurements is compared with another value. Second measurements are initiated on the downlink carrier currently not used by the mobile device based on the comparison. A cell is identified based on the second measurements. The inter-frequency measurements may include receive signal strength indicator (RSSI) measurements, received signal code power (RSCP) measurements, or average channel power-to-total signal power ratio (Ec/Io) measurements. The second measurements may include signal quality measurements.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIGS. 5A and 5B are diagrams of uplink and downlink carrier pairings according to example embodiments of the present invention;

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The embodiments of the present invention relate to WCDMA inter-frequency measurements. The embodiments will be illustrated using an example extension band frequency (e.g., 2.5 GHz band) when allocated for WCDMA downlink. However, another possibility is a band allocation, where 1.7 and 2.1 GHz bands may be used. Since the present invention may also cover a situation where 1.9 GHz operator may have a new band in 2.1 GHz downlink (DL), but is not necessary intending to use 1.7 GHz uplink (UL) at first.

Figure 1:
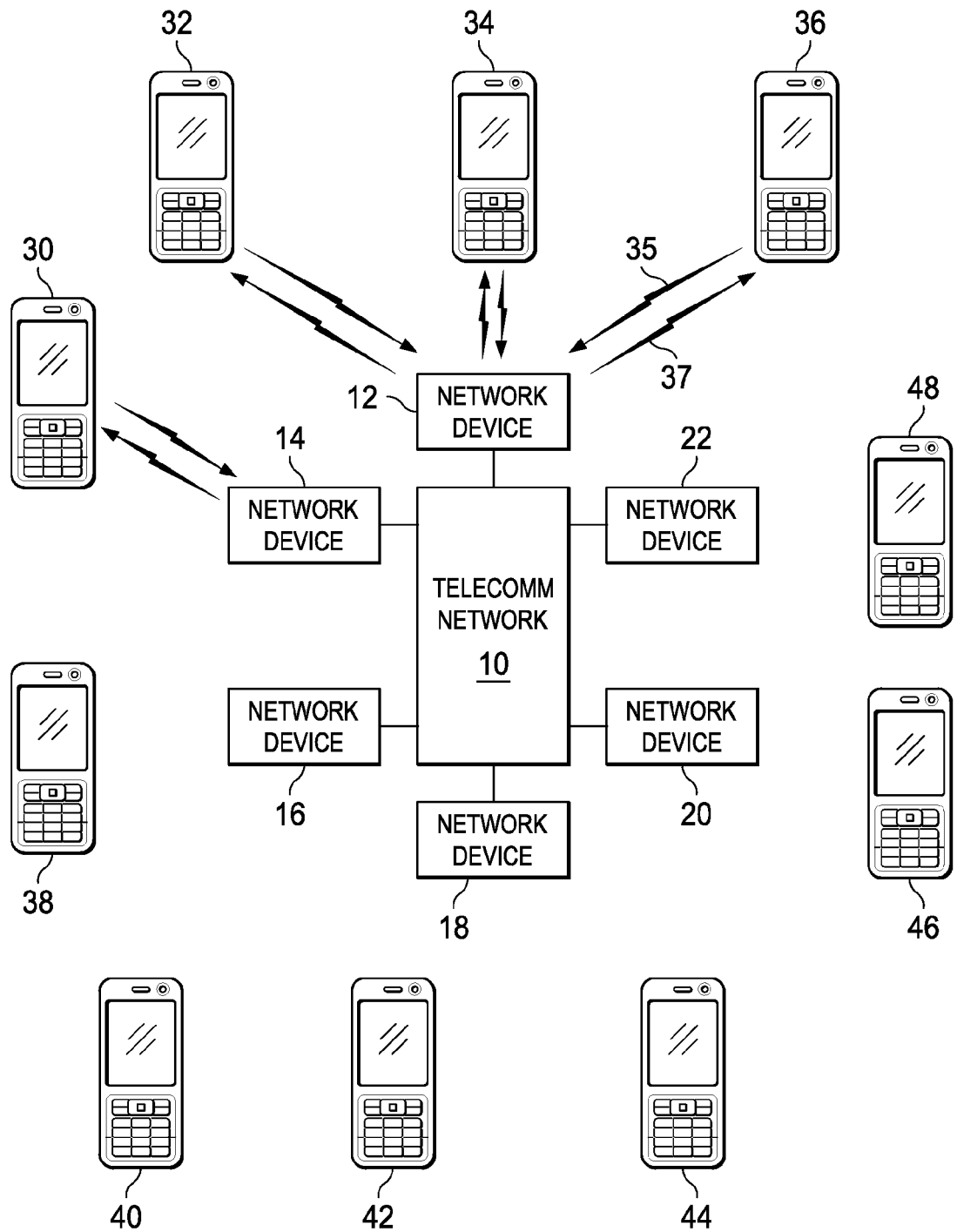
FIG. 1 is a diagram of a system for soft handover detection according to an example embodiment of the present invention.

FIG. 1 shows a diagram of a system for soft handover detection according to an example embodiment of the present invention. The system includes a telecommunications network 10 that includes network devices or nodes 12-22 and mobile devices (e.g., user equipment (UE), mobile nodes (MN), mobile stations (MS), etc.) 30-48. The terms mobile device, mobile node, and user equipment will be used interchangeably throughout the illustration of the embodiments of the present invention and refer to the same type of device.

Network devices 12-22 may be any type of network node or device that supports wireless devices connected to a telecommunications network, for example, a Radio Network Controller (RNC), a Base Station Controller (BSC), etc. Network device 12 and mobile device 36 transfer data and control information between each other via uplink 35 and downlink 37 channels. A base station or cell (not shown) may supply frequencies from a particular band of frequencies that allow a mobile device 36 to select from and use for a downlink carrier and uplink carrier. The uplink carrier frequency and downlink carrier frequency may be from the same band of frequencies, or from different bands of frequencies.

As a mobile device moves from one location to another, the base station or cell closest to the mobile device will likely then supply the uplink and downlink carriers for the particular mobile device. Generally, if the same band of frequencies is available at the neighboring base station, the network device may direct a soft handover to occur between the downlink and uplink carriers supplied from the original base station to downlink and uplink carriers supplied from the neighboring base station.

According to the present invention, a currently used network device 12 and/or neighboring network device 14, possibly along with mobile device 36, may detect soft handover areas before a handover is to occur such that a handover may occur without causing uplink channel interference. As noted previously, uplink interference may be caused when a mobile device moves to a location that does not supply the same bands of frequencies currently being used by the mobile device for its downlink carrier.

Each mobile device 30-48 and/or network device 12-22 may perform various measurements in a periodic or continuous basis to detect soft handover areas for uplink interference avoidance. For example, measurements such as signal strength, signal quality, etc. may be made and compared with similar measurements of carriers from neighboring or co-sited bands to determine if a soft handover area exists and whether a handover should occur to avoid uplink interference. A network device and/or mobile device may determine the types of measurements made and when they are made. Moreover, a network device and/or mobile device may perform the measurements, where in the latter case, a network node may instruct the mobile device to perform the measurements or the mobile device perform the measurements without instruction from the network device. Further, the mobile device may perform the measurements and report the results to the network device whereby the network device decides whether a soft handover area exists and whether a soft handover should occur to avoid uplink interference.

Signal quality of a carrier (downlink or uplink) may include interference from other cells and is related to the signal quality at a specific mobile device. In contrast, signal strength may include the sum of all the signals and indicates the total strength in a specific frequency. With signal strength measurements, there is no differentiating between a particular mobile device's signal and other signals. Co-sited downlink carriers are downlink carriers from the same antenna or same base station or cell as the downlink carrier currently being used by a mobile device.

Relative signal quality may also be a measurement performed. In this method, signal quality may be measured and compared with the signal quality of downlink carriers from another base station. Differences between the two may be then used to determine if a soft handover area exists. Moreover, a mobile device currently using a current downlink carrier from a current cell and moving closer to a neighboring cell may look for a downlink carrier from the neighboring cell from the same frequency band as the current downlink carrier. If a downlink carrier is missing in this band, then the network device and mobile device know that a soft handover area exists where uplink interference may occur if the handover doesn't occur earlier.

Soft handover area detection may occur while a mobile device is in any mode or state, for example, the mobile device may be in an idle mode, or a connected mode where it is waiting for data or actively transmitting data. Depending on the mode or state of the mobile device, may determine what types of measurements (e.g., inter-frequency measurements) may be made.

One reason for handover may be because the mobile device has reached the end of coverage of a frequency carrier in an extension (e.g., 2.5 GHz) band. The end of extension band coverage may invoke inter-band, inter-frequency or inter-system handover. The trigger criteria may always be the same. As inter-band handovers can possibly be done faster, separate trigger thresholds might be implemented. Some example coverage triggers for example implementations according to the present invention may include but are not limited to: handover due to Uplink Dedicated Channel (DCH) quality, handover due to UE Tx power, handover due to Downlink Dedicated Physical Channel (DPCH) power, handover due to common pilot channel (CPICH) received signal code power (RSCP), and handover due to CPICH chip energy/total noise (Ec/No).

Coverage may be another reason for handover. A coverage handover may occur if: (1) the extension band cell has a smaller coverage area (=lower CPICH power or different coverage triggers) than a core band, (2) currently used core band coverage ends (then also extension band), or (3) the UE enters a dead zone.

Intra-frequency measurements may be another reason for soft handover. A soft handover procedure in an extension band may work in principle the same way as in core bands with branch addition, replacement and deletion procedures. SHO procedures may be based on CPICH Ec/Io measurements. Despite stronger attenuation in the extension band, Ec/Io as a ratio may be about the same for both bands. Therefore, in principle the same SHO parameter settings may be used in the extension band. However, if stronger attenuation in an extension band is not compensated for by additional power allocation, the reliability of SHO measurements (Ec/Io) may suffer. Moreover, an extension band cell might have neighbors on extension band frequencies and on core band frequencies at the same time. Then, the UE may have to measure both intra-frequency and inter-band neighbors.

UL interference in the core bands due to delayed soft handover (HO) at the extension band coverage edge may occur. An extension band cell may have both extension band neighbors and core band neighbors at the same time. While for the extension band neighbor the normal SHO procedure may be sufficient, for the core band neighbor an early enough inter-band handover may have to be performed. Otherwise, serious UL interference could occur in the core band neighbor cell. SHO areas might be located relatively close to the base station and thus not necessarily relate to high UE Tx (transmit) power (or base transceiver station (BTS) Tx power). Coverage handover triggers may not be sufficient.

Figure 2:
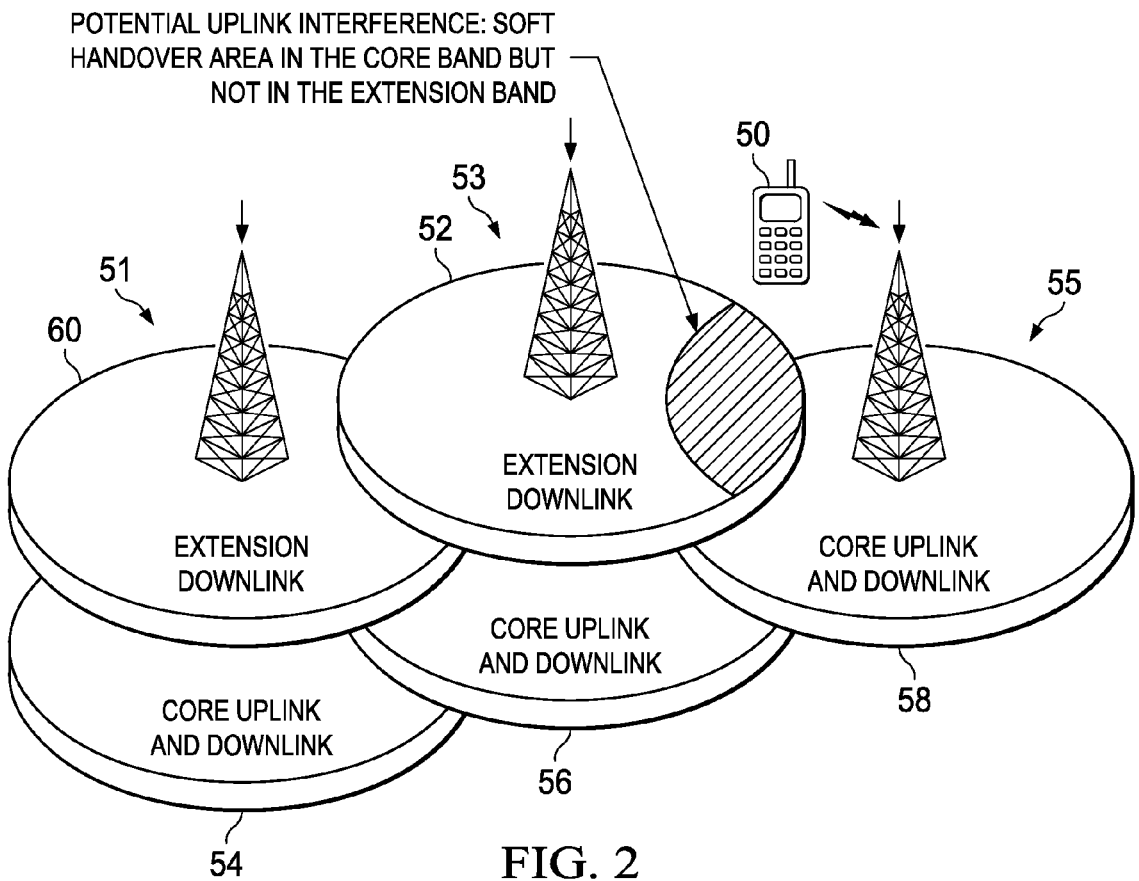
FIG. 2 is a diagram of a potential interface scenario in an uplink channel according to an example embodiment of the present invention.

FIG. 2 shows a diagram of a potential interface scenario in an uplink channel according to an example embodiment of the present invention. Three cells or base stations 51, 53, 55 are shown with slight intersection between neighboring (adjacent) coverage areas. The leftmost cell 51 supplies two co-sited bands of frequencies, an extension band of frequencies 60 and a core band of frequencies 54. The middle cell 53 also supplies two co-sited bands of frequencies, an extension band of frequencies 52 and a core band of frequencies 56. The rightmost cell 55 only supplies a core band of frequencies 58.

In this example embodiment, a mobile device (UE) 50 is using a downlink carrier from an extension band of frequencies 52 from base station 53 closest to the mobile device 50. As a mobile device 50 moves from the left side of base station 53 and approaches cell coverage overlap areas, the mobile device 50 uses UL and DL carriers from neighboring cells (i.e., middle cell 53 and rightmost cell 55). Generally, if the mobile device 50 is using an UL and DL carrier in an extension band (e.g., a band of frequencies starting at approximately 2.5 GHz) cell, once the mobile device 50 moves towards the coverage of a neighboring extension band cell, a soft handover will occur between the DL and UL carriers of the neighbor cells. However, in a situation where there is no neighboring extension band cell as shown here, a soft handover cannot occur since the mobile device 50 must now obtain a DL and UL carrier from a core band (e.g., a band of frequencies starting at approximately 2 GHz) cell. This may cause interference in the UL carrier (not shown) of the neighboring cell. However, according to the present invention, a network device may monitor this situation and cause selection of a different DL carrier in an existing band early to allow a soft handover from the extension band 52 (e.g., 2.5 GHz) in middle cell 53 to the core band 58 (e.g., 2.0 GHz) in the neighboring cell 55, therefore, avoiding potential interference in the UL carrier of the neighboring cell 55.

Figure 3:
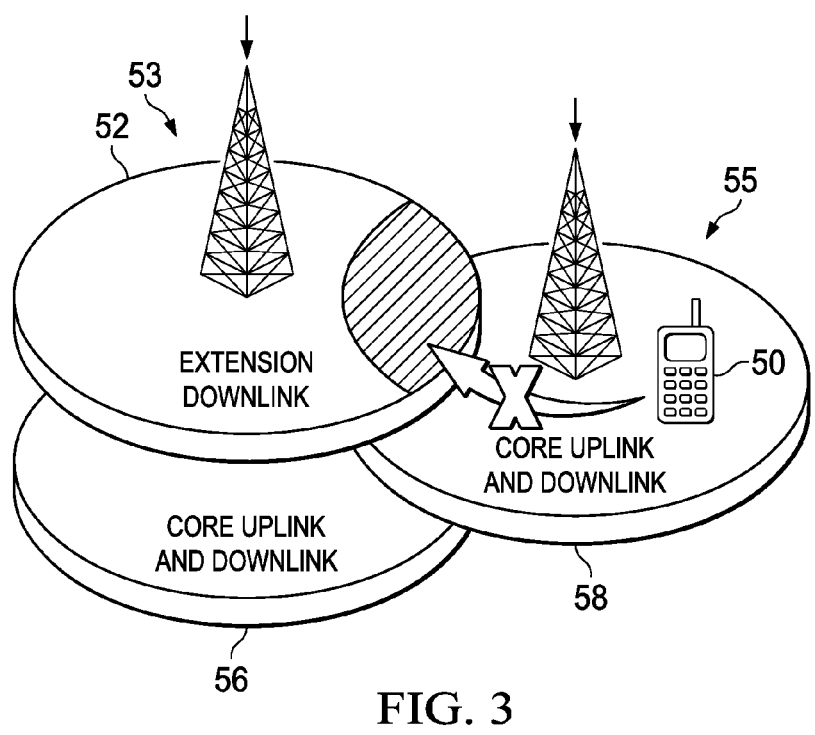
FIG. 3 is a diagram of another potential interface scenario in an uplink channel according to an example embodiment of the present invention.

FIG. 3 shows a diagram of another potential interface scenario in an uplink channel according to an example embodiment of the present invention. In this example embodiment, a mobile device (UE) 50 is using a downlink carrier from a core band of frequencies 58 from base station 55. Mobile device 50 may not make a soft handover to an extension band 52 from base station 53 since the mobile device 50 will be jumping into a potential interference area, causing UL channel interference. According to the present invention, this situation is detected and earlier decisions made regarding handover to avoid UL channel interference.

In order to prevent a directed RRC connection setup into an interfering area, the UE (mobile device) may need to report in a Random Access Channel (RACH) message the measured neighbors in the core band. The message attachment may be standardized but may need to be activated. A network node (e.g., Radio Network Controller (RNC)) then may need to check that all measured cells have a co-sited neighbor in the extension band.

Adjacent cell interference (ACI) detection before the directed setup is automatically given if Forward Access Channel (FACH) decoding in the core band was successful. Load reason handover may be needed in addition to Directed RRC connection setup for congestion due to mobility. The load reason handover in current implementations is initiated by UL and DL specific triggers. By setting the trigger thresholds the operator can steer the load balancing:

for load threshold for Real Time (RT) users, in UL the total received power by the BTS relative to the target received power (PrxTarget) and in DL the total transmitted power of the BTS relative to the target transmitted power (PtxTarget);

for Non Real Time (NRT) users: rate of rejected capacity requests in UL and DL;

Orthogonal code shortage.

In 2.5 GHz operation, UL load may only be balanced by inter-frequency and inter-system handovers whereas DL load may be balanced in addition by inter-band handovers. So, when considering inter-band handovers (UL stays the same) only DL triggers may be important.

Therefore, FIGS. 2 and 3 show that in an extension band (e.g., a band with frequencies starting at approximately 2.5 GHz) edge cells, both intra-frequency measurements for soft handover and continuous inter-frequency measurements (CM) may be needed. One way to guarantee avoidance of UL interference in a core band (e.g., a band with frequencies starting at approximately 2.0 GHz) SHO area is to continuously monitor the core band DL CPICH Ec/Io in the cells where needed, (i.e., in coverage edge cells), and if a SHO area in the core band is detected initiate an inter-band handover.

In contrast, an inter-band handover core band-to-extension band may not occur in cells underlying a extension band coverage edge cell if the UE is in a SHO area. Specifically, a load/service reason inter-band handover during SHO in core bands may not be allowed. Also, inter-band handover core band-to-extension band due to an unsuccessful soft handover (branch addition) procedure may be disabled, but inter-frequency HO allowed.

Compressed mode may also be used for avoidance of adjacent channel protection (ACP)-caused UL interference. ACP caused UL interference may occur at certain UE Tx power levels where the UE location is close to an adjacent band base station. This is mostly a macro-micro base station scenario. The interfered base station may be protected in DL if it is operating in the adjacent extension band carrier otherwise not.

Adjacent channel interference (ACI) probability may directly relate to the mobile device's transmission power. Below certain powers the mobile device cannot interfere to the micro base station and interference detection may not be required. A reasonable value for the power threshold that determines when to start interference detection may need to take into account the statistical probability of MCL (minimum coupling loss) situations, adjacent channel leakage power ratio (ACLR), micro BTS noise level and desensitization. If the power is around the average UE Tx power (=−10 . . . 10 dBm) or higher, the number of mobile devices continuously checking for ACI interference may be reduced significantly.

An interfered base station may not be able to protect itself from ACI interference. The interfering mobile device must voluntarily stop transmission on its current band. Only by also operating in an extension band is the interfered base station self-protected.

Regarding compressed mode operation in an extension band (Cell_DCH), when the UE is operating in the extension band and needs to measure the core DL bands, CM usage in the core band can be applied normally and balancing of UL load may be triggering separately inter-frequency measurements. As described previously, there may be several reasons for inter-band CM measurements when the UE is in the extension band.

Since the DL load of the other band may be known, a network device (e.g., RNC) may initiate instead of an inter-band handover directly, an inter-frequency or inter-system handover in case of high load. Then, separate inter-frequency/inter-system measurements may be performed. In order to minimize the effects on network performance, CM may need to be used very efficiently and one consistent CM usage strategy may need to cover all inter-band measurements. The most excessive CM usage may come from "ACI detection" and "SHO area detection". Both of these may be continuous in case they are needed. Both may be largely avoided either by intelligent carrier allocation in the extension band or by network planning.

Most of the carriers may be protected by carrier allocation. Only if an existing operator is not interested in extension band (e.g., 2.5 GHz) deployment, the UL adjacent carriers may need the ACI detection to protect another carrier from UL interference. Also, if operators want to have different numbers of extension band carriers, at some point, the UL carrier pattern may not be repeatable anymore in the extension band. Further, since a first operator may not use its additional carriers in the same geographical area and starting at the very same time as a second operator, ACI detection may be needed wherever protection from the extension band adjacent carrier is not provided.

UL carriers in the Time Division Duplex (TDD) band may be automatically protected because here the UL carrier may exist only if also extension band is deployed. However, the adjacencies between TDD band and UL band may need special attention as again a first UL carrier can be interfered by a second if it is not (yet) operating in the extension band.

Regarding SHO area detection, network planning can reduce the need of CM by limiting the number of extension coverage edge cells and indicating edge cells via Radio Network Planning (RNP) parameters. If sectorized cells in the core band are fully repeated in the upper band, i.e., no softer handover area in the UL that is not a softer handover area in the extension band, the detection of SHO areas may be made dependent on the UE transmission power or CPICH Ec/Io. However here, it is more difficult to determine a threshold since there is no general limitation how close base stations can be to each other. If almost complete extension band coverage is needed it might be wise not to save on single sites and rather make the coverage as complete as possible. Moreover, if sparse capacity extension is needed, one can consider having less coverage area in the extension band cell by lowering the CPICH pilot power or applying different coverage handover thresholds. This lowers the average UE transmission power in the sparse cell and thus the probability of ACI or unwanted entering in UL SHO area.

Non-regarding network planning, there are still some cells where all reasons for CM are given. Here, the CM usage must be made efficient.

Most all reasons for CM require measurement of the associated DL core band, either own cell or neighbors. ACI detection can also be obtained by measuring the received signal strength indicator (RSSI) of the adjacent carriers in the core. If both SHO area detection and ACI detection is needed, it may be more efficient to rely for both on Ec/Io measurements provided that latter measurement can be done quickly enough. This may be enabled for two reasons: (1) CM in extension band operation can use the fact that extension band DL and core band DL are chip synchronized (assuming they are in the same base station cabinet, i.e., co-sited), and (2) both DL bands have the same or at least very similar propagation path differing merely in stronger attenuation for the extension band.

Two options for chip energy/system noise measurements may include: (1) measure core band average channel power-to-total signal power (Ec/Io) (fast due to chip synchronization)—more accurate, may require a measurement gap of 4-5 timeslots, and (2) measure core band RSSI and use CPICH Ec correlation between bands=>Ec/Io—may require a measurement gap of 1-2 timeslots.

The second option may be preferred due to the short gaps. Basically, not even level measurements (Ec/Io) are required if the relative difference between both DLs RSSI is considered. Uncertainties on the network side (antenna pattern/gain, cable loss, loading, PA rating, propagation loss/diffraction) as well as on the UE side (measurement accuracy) may disturb the comparison and may need to be taken into account if possible.

If a high difference in RSSIs (or low Ec/Io in the core band) is detected, the reason may be verified by:
 measure associated core cell's neighbors→if SHO area (little i) make inter-band handover;
 measure adjacent channel RSSI→if ACI make inter-frequency HO;
 none of above true→no action required (associated core cell's load might be high).

In case (a), handover happens directly to a SHO area. This may require a fast enough branch addition after the inter-band hard handover.

Additionally, CM usage can be minimized by triggering it with some kind of UE speed estimate. If a UE is not moving CM can be ceased, when it moves again CM continues.

Regarding measurements for cell re-selection when the extension band is used, the UE in idle mode camps in the extension band as long as Ec/Io signal is good enough. In connected mode, Packet Switched (PS) services move to Cell_FACH, UMTS Terrestrial Radio Access Network (UTRAN) registration area routing area paging channel (URA_PCH), or Cell_PCH state after a certain time of inactivity (NRT). Then, idle mode parameters may control the cell re-selection. Cell re-selection may then happen for a coverage reason, i.e., when the extension band's coverage ends.

Interference detection may need to be provided also in states controlled by idle mode parameters to prevent UL interference due to RACH transmission. Here, for ACI and SHO area detection different mechanisms may be applied.

SHO area detection in idle mode (and Cell_PCH, URA_PCH) may be enabled by a two-step measurement and applied to the coverage edge cells: (1) a cell specific absolute Ec/Io-threshold triggers step, and (2) measure core band whether there is a cell without inter-band neighbor in extension band. To make the comparison, the UE may need to know the co-sited core neighbors. This may need to be added in extension band broadcast channel system information (BCCH SI). In Cell_FACH state, SHO areas may be detected by using the IF measurements occasions and checking if found neighbors in the core band have a co-sited neighbor in the extension band. Again additional BCCH information may be needed.

Figure 4:
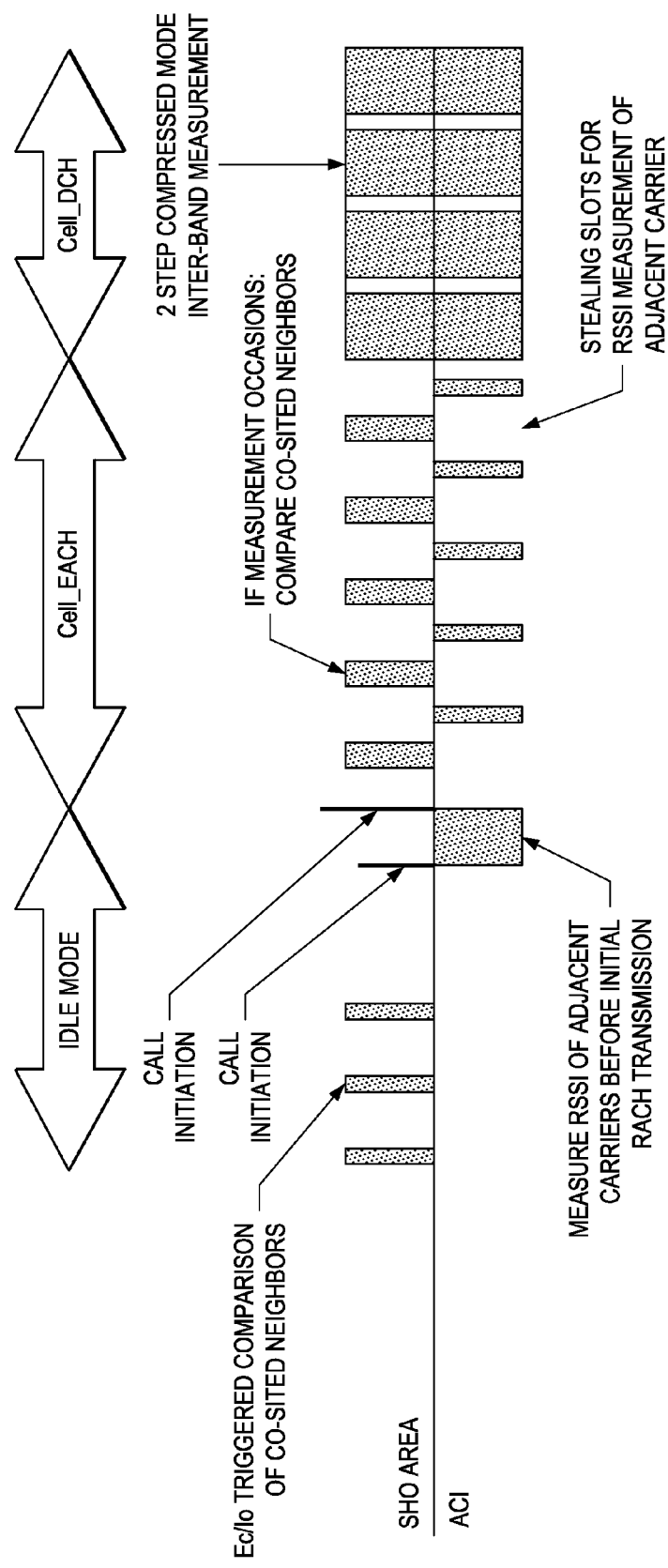
FIG. 4 is a diagram of mobile node measurement activities during different mobile node states according to an example embodiment of the present invention.

FIG. 4 shows a diagram of mobile node measurement activities during different mobile node states according to an example embodiment of the present invention. The different states of the mobile device are shown inside arrows at the top of the figure. The mobile device may be in idle state, cell FACH state, or cell DCH state. The timeline shown in FIG. 4 is divided in half where the top half represents measurements to detect soft handover (SHO) area, and the bottom half represents measurements to detect adjacent channel interference (ACI). The various measurements that occur for each area and during each state of the mobile device along the time line are shown inside the call-outs.

ACI may not be detected in idle mode but immediately before RACH transmission by measuring directly the two neighboring (adjacent) carriers in the core band. The delay in RACH transmission may be negligible due to the fast RSSI measurements. In Cell_FACH state, ACI detection may be provided by continuously measuring the adjacent core carriers (stealing slots for RSSI measurements).

In the case of the SHO area, the UE may initiate an inter-band handover to the core band. In case ACI is detected, the UE may initiate an inter-frequency handover (UL changes) similar to a conventional coverage reason cell re-selection.

FIGS. 5A and 5B show diagrams of uplink and downlink carrier pairings according to example embodiments of the present invention. Uplink and downlink carriers from the existing band generally may be frequencies supplied by the same cell, but may be supplied from different cells. Similarly, uplink and downlink carriers from the new band may be frequencies supplied from the same cell (different from the cell supplying existing band frequencies). The A1, A2, A3, . . . represent different uplink/downlink frequency pairings. The frequencies in the box for each band starting with "A'", may be controlled by one operator at the cell, the frequencies in the blank boxes controlled by a second operator at the cell, and the frequencies in the darkened boxes controlled by a third operator at the cell.

In these example embodiments, the existing uplink frequency band is shown to include frequencies starting at approximately 1920 MHz, the existing downlink band to include frequencies starting at approximately 2110 MHz, and the new uplink and downlink bands to include frequencies starting at approximately 2500 MHz. However, the present invention is not limited by these frequency values but may be applied to any bands of possible frequencies. The frequencies being shown in FIGS. 5A and 5B here are for illustration purposes only, and does not limit the scope of the present invention.

FIG. 5A shows an example embodiment where a mobile node (UE) may be connected with a uplink carrier frequency from an existing uplink band 60 and a downlink carrier frequency from an existing downlink band 62. The existing downlink carrier band 62 may be a core band from a cell closest to the location of the mobile node. A network node may determine that the mobile node should select a second downlink carrier, and direct the mobile node to start using a downlink carrier from frequencies in a new or different downlink band 64 (i.e., from a different cell). The mobile node may then use the uplink carrier from the existing band 60 and a downlink carrier from a new or different downlink band 64.

FIG. 5B shows an example embodiment where a mobile node may have originally been using an uplink carrier from a new uplink band 66 and a downlink carrier from a new downlink band 68. The new uplink band and new downlink band may be from the same band of frequencies (e.g., starting at approximately 2.5 GHz where some frequencies are used for uplink carriers and some for downlink carriers). In this example embodiment, a network node may direct the mobile device to switch over and use a different downlink carrier, but from the same band of frequencies as the original downlink carrier. The frequencies in the new uplink band 66 and the new downlink band 68 may be supplied by the same cell, or from different cells.

According to embodiments of the present invention, inter-frequency measurements may be performed to identify cells and avoid potential interference scenarios. Initially, inter-frequency measurements for co-sited cells are performed. These measurements may include receive signal strength indicator (RSSI) measurements (1-2 slot gaps), received signal code power (RSCP) measurements (4-5 slot gaps), average channel power-to-total signal power ratio (Ec/Io) measurements (4-5 slot gaps), etc. RSSI measurements may be preferred since these measurements are fast since they do not require any synchronization to the other carrier but just the total power is measured. This measurement may be completed in 1-2 slots. Next, cells on other frequencies may be identified based on the results of the measurements. This may take more time since the mobile device may need to identify the scrambling code and timing of the cell by typically utilizing a primary synchronization channel (P-SCH), a secondary synchronized channel (S-SCH) and/or a primary common pilot channel (P-CPICH). Typically, this measurement may be activated by a network device (e.g., radio network controller (RNC)) with compressed mode.

An event triggered reporting could be defined for the mobile device to report the RSSI measurement once the result of a measurement exceeds a predefined value. The reporting threshold may be based on the mobile device transmit (TX) power.

The cells on other frequencies being identified may be skipped if the inter-frequency measurements (e.g., RSSI) do not indicate any strong signal in that frequency. The inter-frequency measurement may be also combined with the information in the network (like load) to decide whether cells on other frequencies need to be identified.

Figure 6:
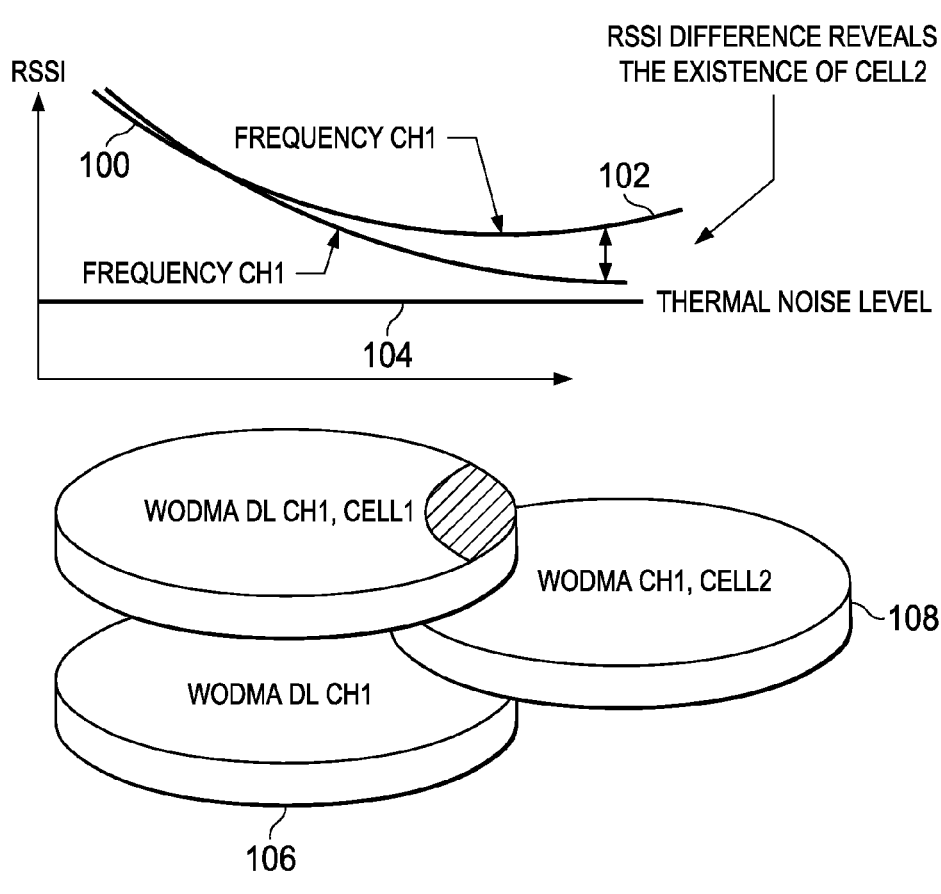
FIG. 6 is a graph illustrating soft handover area detection using RSSI measurements according to an example embodiment of the present invention.

FIG. 6 shows a graph illustrating soft handover area detection using RSSI measurements according to an example embodiment of the present invention. This graph shows an x-axis representing location (i.e., the movement of the mobile device), and a y-axis that represents RSSI. The two curves 100, 102 represent a measured RSSI at a given location for a frequency on channel 1 of a first cell 106 and a frequency on channel 1 from a second cell 108, respectively. Dashed line 104 represents a thermal noise level at the mobile device. As can be seen in the figure, as the mobile device moves, the RSSI of the frequency 100 from the first cell 106 may begin to decrease relative to the RSSI of the frequency 102 from the second cell 108. Inter-frequency measurements (RSSI in this example) and comparison of the measurements to a threshold value or the measured value of the frequency currently used by the mobile device (as shown here) may reveal the existence of another cell, cell2, 108 (i.e., the second cell). Therefore, handover may be initiated to avoid uplink interference.

Two examples using RSSI, one for soft handover area detection and another for adjacent channel interference detection, will be used to further illustrate that inter-frequency measurements (specifically RSSI in this example embodiment) may be used to detect the existence of the downlink before the uplink can cause any interference problems.

Regarding the first example, when an extension band (e.g., 2.5 GHz) downlink connection is used, the downlink CPICH Ec/Io measurements may not be able to be used to detect the soft handover area at the edge of the extension band coverage area. Therefore, the mobile device may need to make periodic inter-frequency measurements on the continuous coverage core band (e.g., 2.1 GHz) downlink carrier. The present invention may be used to trigger the compressed mode measurements, and hence reduce the measurement time with compressed mode. If the RSSI measurements in 2.1 GHz shows that there is a higher received signal power than in 2.5 GHz, the reason can be another cell on the same frequency.

Assuming, for example, that mobile device noise level=100 dBm, UE max uplink power=21 dBm and BTS min transmission power CPICH=33 dBm, the maximum interference level that the mobile device can cause in uplink at the moment it is able to detect the DL chl neighbor=21−(33+100)

=−112 dBm which is below a BTS noise level. Therefore, we can conclude that a RSSI measurement is able to show the existence of the other cell before the mobile device can cause interference in that cell.

Regarding the second example, when the 2.5 GHz downlink connection is used, the downlink does not get dropped because of the adjacent channel interference in 2.1 GHz and the mobile device may interfere the uplink of the adjacent carrier in 1.9 GHz. Assuming; again for example, mobile device noise level=100 dBm, mobile device max uplink power=21 dBm, mobile device Adjacent Channel Selectivity (ACS) and ACLR=33 dB, and BTS min transmission power CPICH=33 dBm (worst case assumption for interfered base station), the maximum interference level that the mobile device can cause in uplink to the adjacent carrier at the moment it is able to detect the other base station=21−33−(33−33+100)=−112 dBm which is below BTS noise level. Therefore, we can conclude that a RSSI measurement is able to show the existence of the adjacent frequency before the mobile device can cause interference in that cell.

Figure 7:
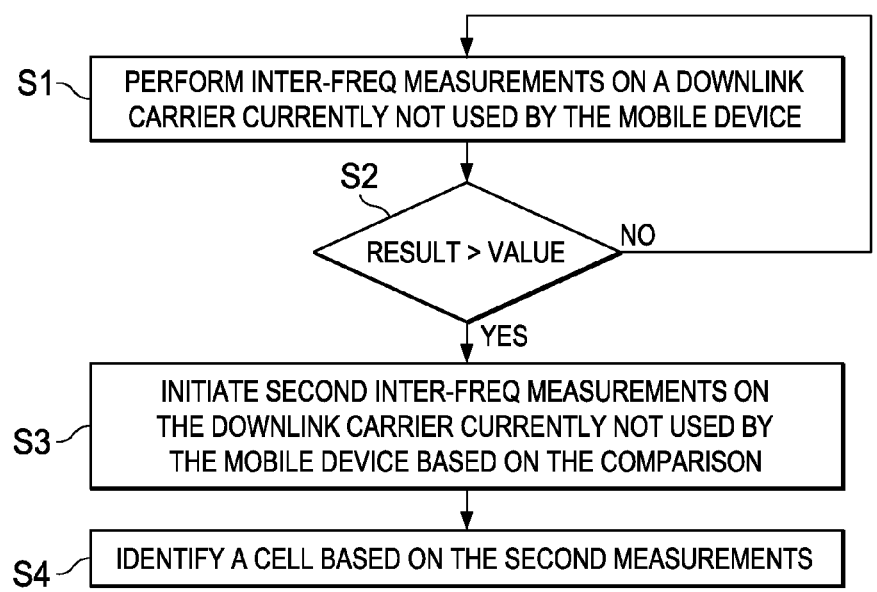
FIG. 7 is a flowchart of a process for cell identification according to an example embodiment of the present invention.

FIG. 7 shows a flowchart of a process for cell identification according to an example embodiment of the present invention. Inter-frequency measurements are performed by a mobile device on a downlink carrier currently not used by the mobile device S1. A result of the inter-frequency measurements is compared with another value S2. Second measurements are initiated on the downlink carrier currently not used by the mobile device based on the comparison S3. A cell is identified based on the second measurements S4.

The inter-frequency measurements may include receive signal strength indicator (RSSI) measurements, received signal code power (RSCP) measurements, or average channel power-to-total signal power ratio (Ec/Io) measurements. The second measurements may include signal quality measurements.

The result of the inter-frequency measurements may be compared with a threshold value or with a value from a measurement of a downlink carrier currently used by the mobile device. Moreover, the result of the inter-frequency measurements may be reported to the network via a network device, e.g., a radio network controller (RNC) or a base station controller (BSC).

More detailed inter-frequency measurements may be initiated. These detailed measurements may include compressed mode measurements. The cell may then be identified based on the more detailed inter-frequency measurements. The detailed inter-frequency measurements may include signal quality measurements, e.g., CPICH Ec/Io measurements.

The value may be set at the mobile device by the network device in advance, or dynamically set based on the current network conditions or based on characteristics of the mobile device.

The downlink carrier currently used by the mobile device may be in an extension band of frequencies, e.g., a band of frequencies starting at approximately 2.5 GHz. The method downlink carrier not currently used by the mobile device may be in a core band of frequencies, e.g., a band of frequencies starting at approximately 2 GHz.

The cell may be identified by identifying the scrambling code and timing of the cell utilizing a primary synchronization channel (P-SCH), a secondary synchronized channel (S-SCH), or a primary common pilot channel (P-CPICH). Moreover, the network device or the mobile device may initiate the identifying of the cell.

The present invention is advantageous in that it allows for the avoidance of severe interference scenarios. Moreover, uplink interference avoidance according to the present invention allows for new frequencies from new bands to be used for uplink and downlink carriers.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. An apparatus operable in a cell employing a downlink carrier configured to:
    perform a first inter-frequency measurement on another downlink carrier at a different frequency than said downlink carrier, wherein said first inter-frequency measurement comprises at least one of a receive signal strength indicator (RSSI) measurement, a receive signal code power (RSCP) measurement, and an average channel power-to-total signal power ratio (Ec/Io) measurement;
    compare a result of said first inter-frequency measurement of said another downlink carrier with another value; and
    perform a second inter-frequency measurement different from said first inter-frequency measurement on said another downlink carrier when said result exceeds said another value to identify another cell from a plurality of co-sited cells, wherein said another downlink carrier of one of said plurality of co-sited cells is skipped and another one of said plurality of co-sited cells is identified based on said second inter-frequency measurement.

2. The apparatus as recited in claim 1 wherein said apparatus is further configured to launch one of an inter-frequency handover and an inter-system handover from said downlink carrier to avoid interference in an uplink carrier.

3. The apparatus as recited in claim 1 wherein said apparatus is further configured to identify said another cell from said plurality of co-sited cells by identifying a scrambling code and timing of said plurality of co-sited cells in accordance with at least one of a primary synchronization channel (P-SCH), a secondary synchronized channel (S-SCH), and a primary common pilot channel (P-CPICH).

4. The apparatus as recited in claim 1 wherein one of said downlink carrier and said another downlink carrier is located in one of a core band of frequencies and an extension band of frequencies.

5. The apparatus as recited in claim 1 wherein said another value is one of a threshold value and a value from a measurement of said downlink carrier.

6. The apparatus as recited in claim 1 wherein said another value is one of a predefined value, a value dynamically set as a function of a network operating conditions associated with said apparatus, and a value based on a characteristic of said apparatus.

7. The apparatus as recited in claim 1 wherein said apparatus is further configured to report said value of said first inter-frequency measurement to a network device.

8. The apparatus as recited in claim 1 wherein said apparatus is further configured to identify said another cell from said plurality of co-sited cells in response to instruction from a network device.

9. The apparatus as recited in claim 1 wherein said second inter-frequency measurement is performed by using a compressed mode.

10. The apparatus as recited in claim 1 wherein said apparatus forms at least a part of a mobile device.

11. A method of operating an apparatus operable in a cell employing a downlink carrier, comprising:
    performing a first inter-frequency measurement on another downlink carrier at a different frequency than said downlink carrier, wherein said first inter-frequency measurement comprises at least one of a receive signal strength indicator (RSSI) measurement, a receive signal code power (RSCP) measurement, and an average channel power-to-total signal power ratio (Ec/Io) measurement;
    comparing a result of said first inter-frequency measurement of said another downlink carrier with another value; and
    performing a second inter-frequency measurement different from said first inter-frequency measurement on said another downlink carrier when said result exceeds said another value to identify another cell from a plurality of co-sited cells, wherein said another downlink carrier of one of said plurality of co-sited cells is skipped and another one of said plurality of co-sited cells is identified based on said second inter-frequency measurement.

12. The method as recited in claim 11 further comprising launching one of an inter-frequency handover and an inter-system handover from said downlink carrier to avoid interference in an uplink carrier.

13. The method as recited in claim 1 wherein said performing said second inter-frequency measurement to identify another cell from said plurality of co-sited cells comprises identifying a scrambling code and timing of said plurality of co-sited cells in accordance with at least one of a primary synchronization channel (P-SCH), a secondary synchronized channel (S-SCH), and a primary common pilot channel (P-CPICH).

14. The method as recited in claim 11 wherein one of said downlink carrier and said another downlink carrier is located in one of a core band of frequencies and an extension band of frequencies.

15. The method as recited in claim 11 wherein said another value is one of a threshold value and a value from a measurement of said downlink carrier.

16. The method as recited in claim 11 wherein said another value is one of a predefined value, a value dynamically set as a function of a network operating conditions associated with said apparatus, and a value based on a characteristic of said apparatus.

17. The method as recited in claim 11 further comprising reporting said value of said first inter-frequency measurement to a network device.

18. The method as recited in claim 11 wherein said performing said second inter-frequency measurement to identify another cell from said plurality of co-sited cells is in response to instruction from a network device.

19. The method as recited in claim 11 wherein said second inter-frequency measurement is performed by using a compressed mode.

* * * * *

UNITED STATES PATENT AND TRADEMARK OFFICE
CERTIFICATE OF CORRECTION

PATENT NO.         : 7,853,260 B2
APPLICATION NO.    : 10/421892
DATED              : December 14, 2010
INVENTOR(S)        : Holma et al.

It is certified that error appears in the above-identified patent and that said Letters Patent is hereby corrected as shown below:

In Col. 14, line 1, claim 13, delete "claim 1" and insert --claim 11--.

Signed and Sealed this
Twenty-fourth Day of May, 2011

David J. Kappos
*Director of the United States Patent and Trademark Office*